United States Patent [19]

Lichtenberg

[11] Patent Number: 4,617,961
[45] Date of Patent: Oct. 21, 1986

[54] PILOT-OPERATED SOLENOID VALVE APPARATUS

[75] Inventor: Wolfgang Lichtenberg, Hanover, Fed. Rep. of Germany

[73] Assignee: WABCO Westinghouse Fahrzeugbremsen GmbH, Hanover, Fed. Rep. of Germany

[21] Appl. No.: 679,338

[22] Filed: Dec. 7, 1984

[30] Foreign Application Priority Data

Dec. 17, 1983 [DE] Fed. Rep. of Germany ....... 3345697

[51] Int. Cl.[4] ............................................ F15B 13/043
[52] U.S. Cl. ............................ 137/596.16; 251/30.03
[58] Field of Search ................... 91/454; 137/596.16; 251/30, 38, 45, 30.03; 303/119

[56] References Cited

U.S. PATENT DOCUMENTS

| 2,708,092 | 5/1955 | Smith | 251/30 |
| 3,423,062 | 1/1969 | Grayson | 251/30 |
| 3,519,022 | 7/1970 | Chung et al. | 251/30 X |
| 3,704,721 | 12/1972 | Schmitz et al. | 137/596.16 X |
| 3,738,607 | 6/1973 | Peruglia | 251/45 X |
| 3,749,125 | 7/1973 | Peruglia et al. | 137/596.16 |
| 4,074,699 | 2/1978 | Stampfli | 251/30 X |
| 4,351,509 | 9/1982 | Stampfli | 251/30 X |

FOREIGN PATENT DOCUMENTS

| 1033984 | 7/1958 | Fed. Rep. of Germany | 137/625.64 |
| 1094065 | 12/1960 | Fed. Rep. of Germany | 251/30 |

*Primary Examiner*—Gerald A. Michalsky
*Attorney, Agent, or Firm*—G. E. Hawranko

[57] ABSTRACT

A pilot-controlled solenoid valve apparatus includes a valve housing having an entrance chamber, an exit chamber, and a discharge chamber formed therein. An inlet valve controls fluid pressure flow from the entrance chamber to the exit chamber while an outlet valve controls fluid pressure flow from an exit chamber to the discharge chamber which exhausts to atmosphere. The inlet and outlet valves each include respective membrane diaphragms which have control chambers disposed on one side; which control chambers are pressurized by means of respective inlet and outlet control valves. Disposed on each of the membrane diaphragms are annular symmetric bodies which each have a longitudinal bore formed therein to allow communication between the respective control chambers and the exit and discharge chambers when the respective control valves are opened. An inlet and an outlet solenoid valve arrangement controls operation of the respective inlet and outlet control valves. A valve anchor associated with each of the solenoid valves has formed on one side thereof, a pilot valve seat. Formed on the opposite side of the valve anchor is a control valve body, which by being formed integrally with the pilot valve body, allows simultaneous operation of the solenoid and control valve portions of the solenoid valve apparatus. A bias spring engages the valve anchor near the control valve body to urge the anchor and thus, the control valve body toward the annular symmetric body on which is formed the control valve seat, when the solenoid valve arrangement is not energized.

11 Claims, 1 Drawing Figure

U.S. Patent    Oct. 21, 1986    4,617,961
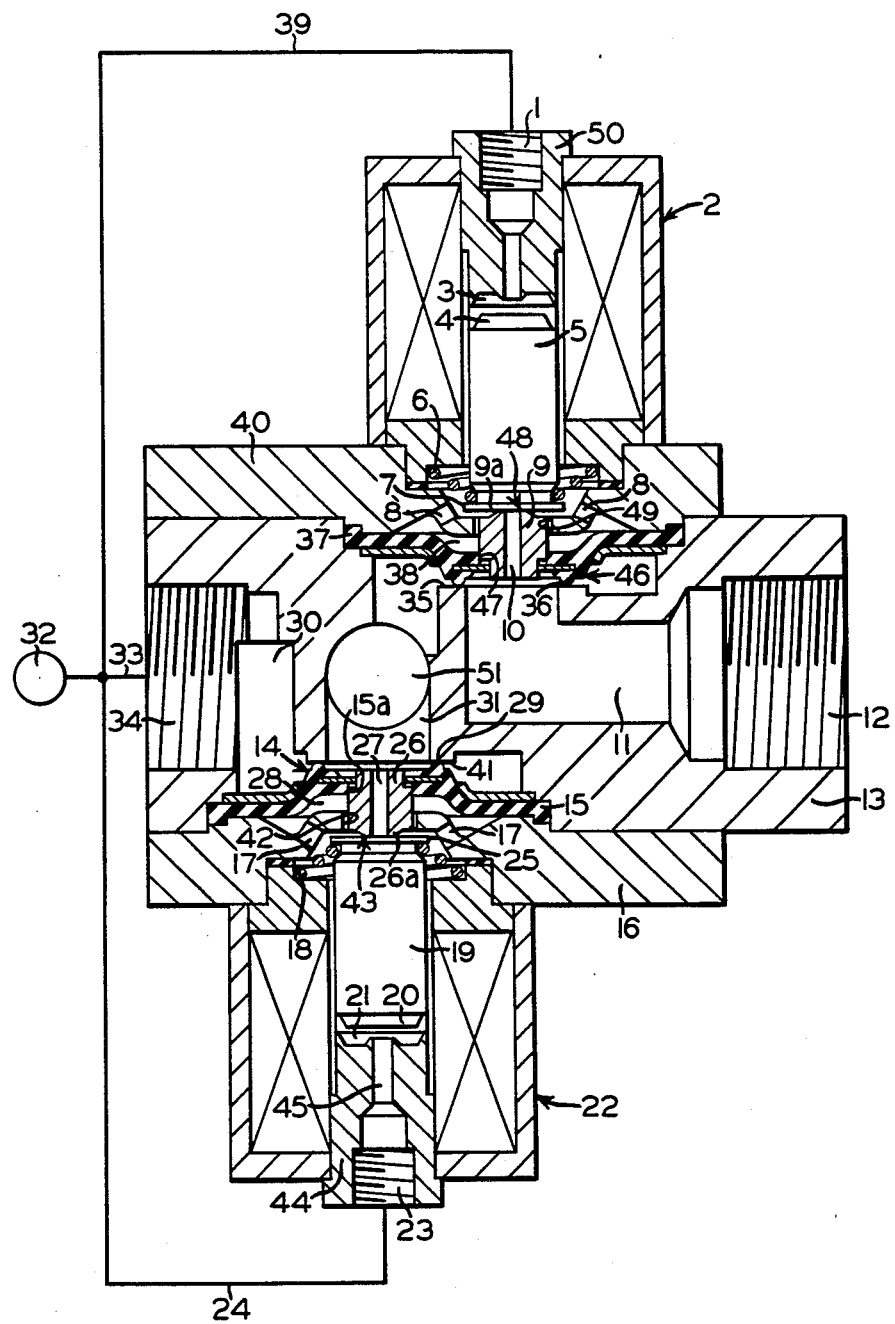

PILOT-OPERATED SOLENOID VALVE APPARATUS

BACKGROUND OF THE INVENTION

The invention relates to a fluid-pressure-controlled, pilot-operated solenoid valve apparatus, especially such a solenoid valve apparatus which is suitably operable in an environment requiring a precise and timely control of fluid pressure flow therethrough. One use of such a fast-acting, precisely-controlled solenoid valve apparatus could be on an anti-skid braking system which operates to release fluid pressure from a brake cylinder upon sensing an excessive amount of wheel slip. An example of such a system including a solenoid valve can be found in Great Britain Pat. No. 1416204, wherein is disclosed a solenoid valve having inlet and outlet valve portions connnected partially in series such that, venting of fluid pressure to atmosphere during a brake release operation is dissipated within the apparatus so as to prevent excessive noise being generated thereby. A disadvantage that this known device exhibits is that the response time of the membrane which forms part of the inlet and outlet valves is not fast and therefore requires a bias spring to effect rapid valve closure, such bias spring thereafter serving to further slow valve opening since sufficient fluid pressure must be introduced to overcome the bias spring force.

Additionally, known solenoid valves employing a membrane separating a control valve from either the inlet or outlet valve have exhausted the fluid pressure which operates the control portion of the valve, to atmosphere.

Of course, the fast-acting, precisely-controlled solenoid valve apparatus has numerous applications in addition to the above-mentioned wheel skid arrangement, such additional applications as will become evident upon a complete reading of the disclosure.

SUMMARY OF THE INVENTION

It is, therefore, an object of the invention to provide a pilot-operated solenoid valve apparatus, exhibiting a fast response opening and closing valve operation for both the inlet and outlet valve portions.

It is a further object of the invention to provide a pilot-operated solenoid valve apparatus whereby fluid pressure introduced to effect operation of the control valve portions is not exhausted to atmosphere, but is communicated to the fluid pressure consumer.

It is an even further object of the invention to provide a pilot-operated solenoid valve having inlet and outlet valve portions of substantially similar construction thereby facilitating manufacture and maintenance operations.

Briefly, the invention consists of a valve housing having disposed therein an inlet valve portion and an outlet valve portion, each having a valve membrane element which, by contacting a portion of the valve housing adjacent a discharge chamber, form the respective inlet and outlet valves which allow communication with the fluid pressure consumer. Disposed on the sides of the valve membrane elements opposite the inlet and outlet valves are respective inlet and outlet control chamber, control valve configurations, which are pressurized according to operation of respective solenoid valve portions. Disposed within the valve membrane elements are inlet and outlet valve bodies which have bores formed therein such that, when the respective control valves are opened, the fluid pressure present in the control chambers flows therethrough to the discharge or exhaust chambers. The solenoid valves have spring-biased solenoid valve bodies which contact the inlet and outlet valve bodies when the solenoid valves are deenergized.

BRIEF DESCRIPTION OF THE DRAWINGS

FIG. 1 is an elevational view, in section, of a solenoid valve apparatus constructed in accordance with the invention.

DESCRIPTION AND OPERATION

As seen in FIG. 1, the fluid-pressure-operated, pilot-controlled solenoid valve apparatus includes a valve housing 13 enclosed on the top and bottom by first and second valve covers 16, 40. Formed in the valve housing 13 is an entrance chamber 30 which is put into fluid communication with a fluid pressure source 32 by means of a first pressure line 33 and a first pressure opening 34. An exit chamber 31 is also formed in the valve housing 13 and communicates via an outlet port 51 with a fluid pressure consumer (not shown). A third chamber formed in the valve housing 13 is a discharge chamber 11, which is open to atmosphere by means of a second pressure opening 12.

The entrance chamber 30 and the exit chamber 31 can be connected with one another by means of an inlet valve shown generally at 14. The inlet valve 14 consists essentially of an inlet valve seat 41, which is formed at the valve housing 13 intermediate the entrance chamber 30 and exit chamber 31 and an inlet valve body 15, which is designed as a membrane element. The inlet valve body 15 has a first sealing projection 29 on the side facing the inlet valve seat 41. The inlet valve body 15 exhibits a central recess 15a in which a first annular symmetric body 26 having a first longitudinal bore 27 formed therein is firmly attached to the first valve body 15. The first annular symmetric body 26 exhibits a first lower valve seat 26a which forms a portion of a first control valve shown generally at 43. The first annular symmetric body 26 and hence the inlet valve body 15 are guided in a recess 42 formed in the valve housing 13. Formed on the side of the membrane which forms the first valve body 15 opposite the inlet valve 14 is a first control chamber 28. The first valve body 15 separates the entrance chamber 30 from the first control chamber 28.

A first electromagnet valve 22 is disposed on the first valve cover 16 of the valve housing 13 so that a first solenoid valve anchor 19 can be moved toward or away from the first lower valve seat 26a formed by a portion of the first annular symmetric body 26. The first solenoid valve anchor 19 exhibits on the side facing the first lower valve seat 26a a first upper valve body 25, which can be brought into contact with the first lower valve seat 26a by means of a first bias spring 18 acting on the first solenoid valve anchor 19. The first lower valve seat 26a and the first upper valve body 25 connected with the first solenoid valve anchor 19 form the first control valve 43, by means of which the first control chamber 28 can be put into fluid communication with the exit chamber 31.

On the end of the first solenoid valve anchor 19 facing away from the first control valve 43, there is a first solenoid valve body 20 which, together with a first solenoid valve seat 21, disposed in a first guide tube 44 constructed as a portion of the first electromagnet valve 22, forms the valve portion of the first electromagnet valve 22 by means of which the first control chamber 28 can be put into fluid communication with the fluid pressure source 32 over a second pressure line 24 and a second pressure opening 23. First guide bore 45 is formed in the first guide tube 44 such that, fluid pressure can flow from the second pressure opening 23 around the first solenoid valve anchor 19 and into the first control chamber 28. It should be noted that though fluid pressure can flow around the solenoid valve anchor 19, the solenoid valve anchor 19 moves in a guided manner within the solenoid valve 22 under the influence of a spline arrangement or equivalent guiding arrangement.

Formed in the first valve cover 16 of the valve housing 13, in the vicinity of the first control valve 43, associated with the first electromagnet valve 22, there is a first plurality of through bores 17, by means of which the first control chamber 28 is pressurized and ventilated.

The exit chamber 31 and the discharge chamber 11 leading to atmosphere can be connected with one another by means of an outlet valve shown generally at 46. The outlet valve 46 is formed by a second valve seat 35 which is firmly attached to the valve housing 13 and a second membrane element 37 equipped with a second sealing projection 36. The second membrane element 37, with its first active surface, defines the exit chamber 31 and with a second active surface facing away from the exit chamber 31, defines a second control chamber 38.

The second membrane 37 exhibits a second central recess 47, in which is disposed a second annular symmetric body 9 serving as the second lower valve seat 9a for a second control valve shown generally at 48. The second annular symmetric body 9 is provided with a second longitudinal bore 10. A second annular symmetric body 9 is guided in a second recess 49, formed in the valve housing 13.

On the second valve cover 40 of the valve housing 13, the second electromagnet valve 2 has disposed therein a second solenoid valve anchor 5 which can be moved toward or away from the second annular symmetric body 9. The second solenoid valve anchor 5 has, on its side facing the second annular symmetric body 9, a second upper valve body 7, which is brought into contact with the second annular symmetric body 9 by means of a second bias spring 6 acting on the second solenoid valve anchor 5. The second annular symmetric body 9 exhibits a second lower valve seat 9a which, when connected to the second upper valve body 7, form the second control valve 48 by means of which the second control chamber 38 can be put into fluid communication with the discharge chamber 11.

On the end face of the second solenoid valve anchor 5, facing away from the second control valve 48, associated with the second electromagnet valve 2, there is a second solenoid valve body 4 which, together with the second solenoid valve seat 3, located in a second guide tube 50, formed as a portion of the second electromagnet valve 2, form the inlet valve portion of the second electromagnet valve 2 by means of which the second control chamber 38 can be connected with the fluid pressure source 32 over a third pressure line 39 and third pressure opening 1. A second guide bore is formed in the second guide tube 50 of the second electromagnet valve 2 such that, fluid pressure can flow from the third pressure opening 1 around the second solenoid valve anchor 5, and then to the second control chamber 38.

Formed in the second valve cover 40 of the valve housing 13, in the vicinity of the second control valve 48, associated with the second electromagnet valve 2, there is a second plurality of through bores 8, by means of which the second control chamber 38 is pressurized and ventilated.

The operation of the fluid-pressure-operated, pilot-controlled solenoid valve apparatus will first be described assuming that the fluid pressure consumer, connected to the exit chamber 31 of the device, has been pressurized, and that the solenoid valve apparatus is in the closed condition, as shown in the Figure. In this closed condition, the inlet valve 14 is closed so that the flow of fluid pressure from the fluid pressure source 32 to the fluid pressure consumer is interrupted. The outlet valve 46 is also in the closed position, so that the fluid communication between the fluid pressure consumer and atmosphere is also interrupted.

By means of the first pressure line 33, fluid pressure is introduced to the entrance chamber 30 and exerts a force on the first membrane element 15, which can be characterized as a first control diaphragm, such force tending to urge the first membrane 15 toward the first control chamber 28. Additionally, by means of the inlet valve portion of the first electromagnet valve 22, fluid pressure is introduced to the first control chamber 28, and also acts on the first membrane element 15 to urge the first membrane element 15 in the direction of the entrance chamber 30. Since the active surface of the first membrane element 15 facing the first control chamber 28 is greater than the active surface area facing the entrance chamber 30, the first sealing projection 29 is held against the first valve seat 41.

In the exit chamber 31, the fluid pressure present in the fluid pressure consumer prevails and urges the second membrane element 37, which can also be characterized as a second control diaphragm, toward the second control chamber 38. Additionally, at the same time, there is a delivery fluid pressure in the second control chamber 38, which has been introduced thereto via the third pressure line 39, the third pressure opening 1, and the opened inlet portion of the second electromagnet valve 2. Since the fluid pressure introduced to the second control chamber 38 through the open second electromagnet valve 2 acts on the larger active surface of the second membrane element 37, the second membrane element 37 is urged toward the exit chamber 31, whereby the second sealing projection 36 of the outlet valve 46 is pressed against the second valve seat 35, holding the outlet valve in a closed position.

If the fluid pressure in the consumer is to be reduced, the second electromagnet valve 2 must be reversed by means of an electrical signal. The inlet valve portion 3, 4 of the second electromagnet valve 2 then closes, and the second control valve 48 opens. The fluid pressure in the second control chamber 38 then decreases by passage of such fluid pressure through the second longitudinal bore 10 to the discharge chamber 11 and atmosphere. The force of the fluid pressure present in the fluid pressure consumer, which occurs in the exit chamber 31, and acts on the second membrane element 37, prevails such that the second sealing projection 36 associated with the outlet valve 14 is raised off of the second valve seat 35. Via the outlet valve 14 now opened and the discharge chamber 11, the fluid pressure in the exit chamber 31 and therefore also the fluid pressure in the consumer is reduced.

If the second electromagnet valve 2 is again reversed, the second control valve 48, associated with the second electromagnet valve 2, assumes the closed position by means of the second bias spring 6 urging the second solenoid valve anchor 5 against the second annular symmetric body 9, and the corresponding inlet valve portion 3, 4 of the electromagnet valve 2 is opened. In this manner, it can be appreciated that this mechanical action contributes to the rapid action of the valve operation. By means of the third pressure line 39, the third pressure opening 1 and the opened inlet valve portion 3, 4 of the second electromagnet valve 2, the second control chamber 38 is pressurized. The outlet valve, therefore, assumes the closed position.

If fluid pressure is to be reintroduced to the fluid pressure consumer, the first electromagnet valve 22 is energized. The inlet valve portion 20, 21 of the first electromagnet valve 22 then closes and the corresponding first control valve 43, associated with the first electromagnet valve 22, opens. The fluid pressure from the first control chamber 28 is then channeled into the exit chamber 31, and thereafter delivered to the fluid pressure consumer. In this manner, it can be appreciated that fluid pressure present in the first control chamber 28 is not exhausted to atmosphere, but is efficiently used to assist in the pressurization of the fluid pressure consumer. Also in this manner, it can be appreciated that the consumer is pressurized in two stages, the first from the control chamber 28, and the second from the opened inlet valve 14. The fluid pressure delivered from the fluid pressure source 32 then enters the entrance chamber 30 and prevails upon the first membrane element 15, thus urging the first membrane element 15 and first sealing projection 29 off of the first valve seat 41. Via the inlet valve 14, which is now opened, and the exit chamber 31, fluid pressure is admitted to the fluid pressure consumer.

If the pressure is to be retained in the fluid pressure consumer, the first electromagnet valve 22 is then reversed. The first control valve 43, associated with the first electro magnet valve 22, closes again as a result of the fast-acting mechanical action of the first bias spring 18 urging the first solenoid valve anchor 9 against the first annular symmetric body 26, and the corresponding inlet valve portion 20, 21 of the first electromagnet valve 22 assumes the open position, whereby the first control chamber 28 is again pressurized with the delivery fluid pressure from the fluid pressure source 32, over the second pressure line 24, and the first pressure opening 23. On account of the difference in the area between the active surfaces of the first membrane element 15, adjoining the entrance chamber 30 and also the first control chamber 28, the inlet valve 14 is placed in the closed position.

Although the hereinabove detailed discussion presents the preferred embodiment of the invention, it can be appreciated that modifications can be made thereto without departing from the scope of the invention, as detailed in the appended claims.

Having now described the invention, what I claim as new and desire to secure by Letters Patent, is:

1. A fluid-pressure-operated, pilot-controlled solenoid valve apparatus for regulating the flow of fluid pressure in a fluid pressure consumer, said solenoid valve apparatus comprising:
   (a) a valve housing having formed therein an entrance chamber and an exit chamber in fluid communication with an outlet port;
   (b) inlet valve means disposed within said valve housing intermediate said entrance chamber and said exit chamber for allowing fluid pressure to flow from said entrance chamber to said exit chamber when in an open condition, said inlet valve means including a diaphragm element movable between such open condition and a closed condition;
   (c) an annular sysmmetric body disposed on said diaphram element having a longitudinal bore formed therein;
   (d) an inlet control valve having a lower valve seat formed by a portion of said annular sysmmetric body and a control valve body which, when in contact with said lower valve seat, blocks said longitudinal bore and closes said inlet control valve;
   (e) a control chamber formed in said valve housing adjacent one side of said diaphram element, said control chamber being in fluid communication with said exit chamber when said inlet control valve is in an opened condition;
   (f) pilot valve means disposed in said valve housing adjacent said inlet control valve for opening said inlet control valve when selectively activated, said pilot valve means including a spring-biased pilot valve body which is urged toward said control chamber when said pilot valve means is deactivated thereby closing said inlet control valve, said control valve body and said pilot valve body being formed on opposite ends of a valve anchor member in such a manner that said inlet control valve and said pilot valve means are simultaneously operated to alternate open and closed positions thereby, such open position of said pilot valve means being effective such that, fluid pressure substantially equivalent in pressure value to that present in said entrance chamber, flows around said valve anchor member and into said control chamber; and
   (g) a discharge chamber formed in said valve housing adjacent said exit chamber and an outlet valve means formed in said valve housing intermediate said exit chamber and said discharge chamber for exhausting, when in an open condition, fluid pressure present in said exit chamber, said outlet valve means including a second diaphragm element movable between an open and a closed position.

2. A solenoid valve apparatus, as set forth in claim 1, further comprising a second annular sysmmetric body disposed on said second diaphragm element and having a second longitudinal bore formed therein; an outlet control valve having a second lower valve seat formed by a portion of said second annular sysmmetric body and a second control valve body which, when in contact with said second lower seat, blocks said second longitudinal bore and closes said outlet control valve; and a second control chamber formed in said valve housing adjacent one side of said second diaphragm element, said second control chamber being in fluid communication with said discharge chamber when said outlet control valve is in an open position.

3. A solenoid valve apparatus, as set forth in claim 2, wherein said diaphragm element and said second diaphragm element are elastic membrane diaphragms secured around the circumference by said valve housing and respective first and second valve covers.

4. A solenoid valve apparatus, as set forth in claim 3, wherein said annular symmetric body and said second annular symmetric body are coaxially secured within said membrane diaphragm element and said second membrane diaphragm element for coincident movement therewith.

5. A solenoid valve apparatus, as set forth in claim 3, wherein said membrane diaphragm element has a first diaphragm surface area which faces said control chamber and is of a larger area than a second diaphragm surface area formed on said membrane diaphragm element opposite said first diaphragm surface area, said second diaphragm surface area facing said exit chamber.

6. A solenoid valve apparatus, as set forth in claim 2, wherein said outlet valve means further includes an outlet valve seat formed on said valve housing adjacent said discharge chamber, and a second annular symmetric body formed on said second diaphragm element and in contact with said outlet valve seat to effect a closed condition of said outlet valve means.

7. A solenoid valve apparatus, as set forth in claim 1, wherein said inlet valve means includes an inlet valve seat formed on said valve housing adjacent said exit chamber and an annular projection extending from said diaphram element and in contact with said inlet valve seat to effect a closed condition of said inlet valve means.

8. A solenoid valve apparatus, as set forth in claim 1, wherein said outlet valve means includes an outlet valve seat formed on said valve housing adjacent said discharge chamber and a second annular symmetric body extending from said second diaphragm element and in contact with said outlet valve seat when said outlet valve means is in such closed condition.

9. A solenoid valve apparatus, as set forth in claim 8, further including a second pilot valve means disposed in said valve housing adjacent said outlet control valve for opening said outlet control valve when selectively activated, said second pilot valve means including a second spring-biased pilot valve body which is urged toward said second control chamber when said second pilot valve means is deactivated thereby closing said outlet control valve.

10. A solenoid valve apparatus, as set forth in claim 1, wherein said pilot valve means further includes a pilot valve seat formed on a first tubular body, said pilot valve body seating on said pilot valve seat when said pilot valve means is in a closed condition, and said pilot valve means further including a pilot through bore formed in said first tubular body and through which such fluid pressure flows for pressurization of said control chamber when said pilot valve means is in an open condition.

11. A solenoid valve apparatus as set forth in claim 1 wherein said control valve body is movable in a guided manner within a guide recess formed in said valve housing adjacent said control chamber, such guided movement of said control valve body preventing said diaphragm element from moving in a plane transverse to the plane of movement.

* * * * *

UNITED STATES PATENT AND TRADEMARK OFFICE
CERTIFICATE OF CORRECTION

PATENT NO. : 4,617,961
DATED : October 21, 1986
INVENTOR(S) : Wolfgang Lichtenberg It is certified that error appears in the above-identified patent and that said Letters Patent are hereby corrected as shown below:

Column 6, claim 1, clause (c), line 9, delete "diaphram" and insert --diaphragm-- claim 1, clause (e), line 18, delete "diaphram" and insert --diaphragm--

Column 7, claim 7, line 23, delete "diaphram" and insert

--diaphragm--

Signed and Sealed this

Twenty-eighth Day of April, 1987

*Attest:*

DONALD J. QUIGG

*Attesting Officer*   Commissioner of Patents and Trademarks